UNITED STATES PATENT OFFICE.

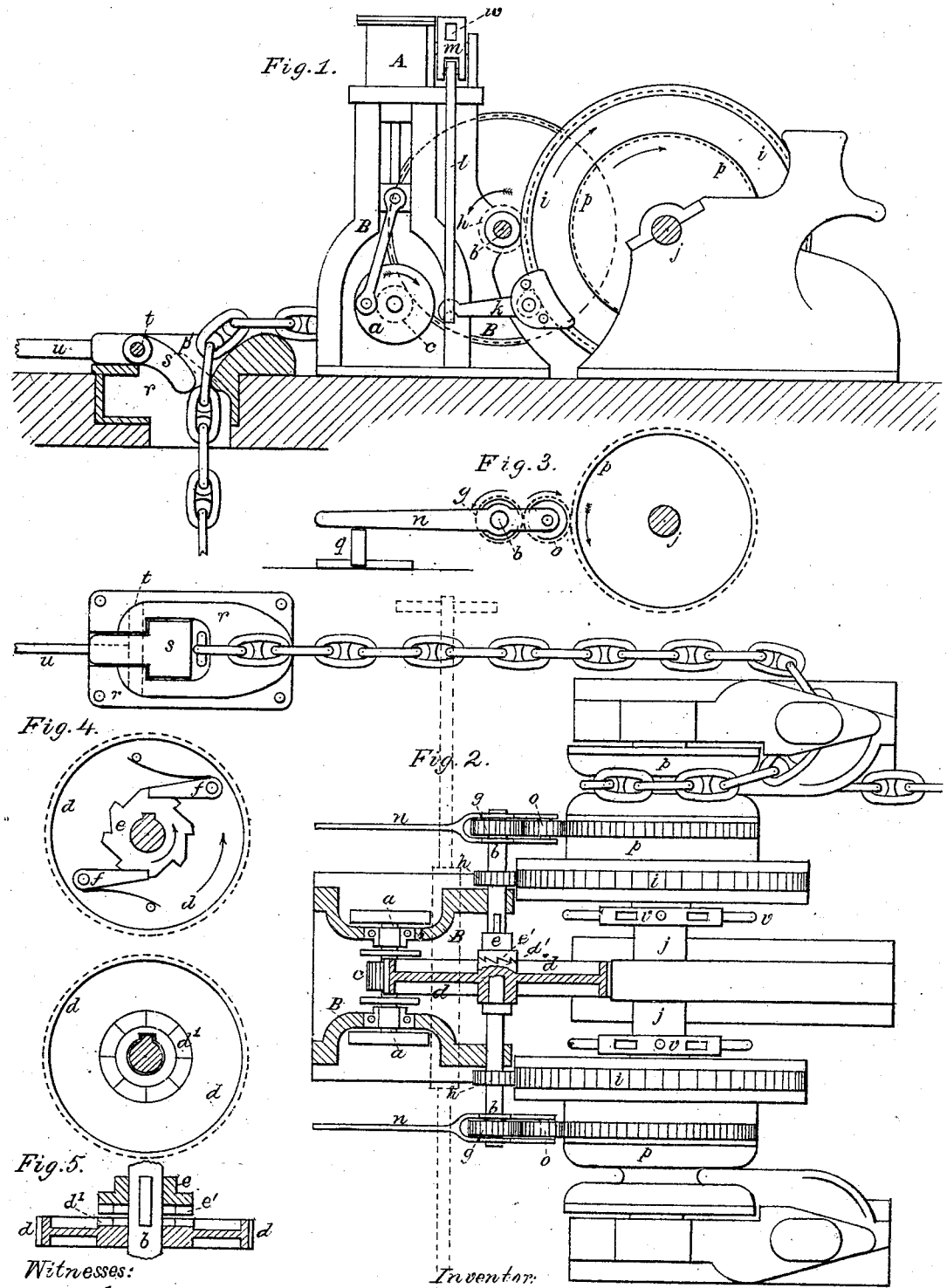

WILLIAM HORATIO HARFIELD, OF LONDON, ENGLAND.

IMPROVEMENT IN WINDLASSES.

Specification forming part of Letters Patent No. 145,866, dated December 23, 1873; application filed October 23, 1873.

*To all whom it may concern:*

Be it known that I, WILLIAM HORATIO HARFIELD, of Mansion House Buildings, London, England, have invented certain Improvements in Steam and other Windlasses and Chain-Controllers, of which the following is a specification:

This invention consists in the arrangement of nipping-levers in combination with the barrel of a ship's windlass when geared with a steam-engine, so that said levers may act as pawls to prevent both a reverse motion of the barrels and an undue strain being brought upon the gearing or engine when the windlass is worked by the engine, and also serve to rotate the barrels when the windlass is operated by manual power, and to obviate danger to the men when manual power is used as an auxiliary to the steam; also, in a wheel provided with a self-acting clutch interposed between the crank-shaft of the engine and the windlass-barrel, to communicate motion to the latter when worked by the engines, but allow of the barrel being rotated when worked by manual power without imparting motion to the engine or intermediate gearing; and in combination therewith, and with the chain-wheels of the windlass-barrel, of a pinion mounted upon the end of a lever, which, by moving the same, may be interposed between a driving-pinion on the counter-shaft and the chain-wheels of the windlass-barrel, to reverse the motion of the latter for raising and paying out the chain.

Figure 1 of the accompanying drawings is a side elevation of my improved ship's windlass, the reversing-pinion and lever and a portion of the windlass-shaft being removed, and the chain controller or check being shown in section. Fig. 2 is a plan view of the windlass, with the self-acting clutch-wheel and the engine-standards in section. Fig. 3 is a detailed view of the reversing-pinion and lever, and Figs. 4 and 5 are views of the self-acting clutch-wheel.

As shown in the drawings, I place either in front or behind the windlass-barrel a steam-engine, A, Fig. 1, by preference having two cylinders, inverted and resting on the top of a standard, B B, the lower part carrying bearings for the crank-shaft $a$ and the counter-shaft $b$, as shown in Figs. 1 and 2. On the crank-shaft $a$ is a pinion, $c$, which gears with an intermediate toothed wheel, $d$, which is connected with the counter-shaft $a$ by any suitable self-acting clutch, $e'$ $d'$, Fig. 2, the hub of the wheel having sloped or ratchet teeth $d'$, (shown in plan and section in Fig. 5,) which engage with corresponding teeth on a sleeve, $e$, sliding on a feather on the shaft $b$ when the wheel $d$ is revolved in one direction; but when revolved in the other, the sloped teeth, by not engaging, throw the wheel $d$ and shaft $b$ out of gear; or the clutch may be formed as shown in Fig. 4, in which a ratchet-wheel is secured to the counter-shaft $b$, against the teeth of which are pressed one or more pawls, $f f$, secured to the wheel $d$, which, when the wheel is revolved in the direction of the arrow, engage with the ratchet-teeth and revolve the counter-shaft, but slip when revolved in the other direction; or, if the shaft and ratchet-wheel are revolved in the same direction, they slip without imparting motion to the wheel $d$, as in the other form of clutch, which will be understood upon reference to Fig. 4. Upon the counter-shaft $b$ are permanently secured two pinions, $h$ $h$, Fig. 2, which are permanently in gear with the toothed purchase-wheels $i$ $i$, keyed to the windlass-shaft $j$. Two additional pinions, $g$ $g$ are secured to the counter-shaft $b$ outside the ones just mentioned, and in a line with the teeth of the chain-wheels $p$, the latter being loose upon the shaft $j$, but engaged with it or disengaged by the brake or clutch wheels $v$ $v$, which operate through the centers of the purchase-wheels $i$ $i$. In a line with the pinions $g$ $g$ and the teeth of the chain-wheels $p$ $p$ are two pinions, $o$ $o$, each mounted on the end of a lever, $n$. (Seen in plan in Fig. 2, and in elevation in Fig. 3.) These mounted pinions are employed for reversing the motion of the chain-wheels for paying out chain, and at other times are disengaged therefrom; but by moving the levers $n$ $n$ into the position shown, the pinions $o$ $o$ are interposed between the driving-pinions $g$ $g$ and the toothed rims of the chain-wheels, by which they gear with one another, and reverse the motion of the chain. The toothed wheels $i$ $i$ are provided with two nipping-lever pawls, $k$ $k$, Fig. 1, the shorter arms of the levers pressing against the edges of the wheels, the long arms projecting toward the steam-engines, and are connected, by rods $l$, to the opposite ends of a lever, $m$, Fig. 1, (the end only being seen,) which is mounted on a horizontal pin above the bed-plate, and arranged transversely of the windlass, as shown by the dotted lines in Fig. 2, the ends being provided with sockets $w$, to receive rods or hand-levers, for operating by manual power, so that the pawls $k$, which, when the windlass is worked by the engine, prevent the windlass from being turned in the reverse direction, are available also, when required, for working the windlass by hand-labor, either to assist the steam without danger to the men, or to work the windlass without the steam. In this case, while the wheels $i$ $i$ are being rotated, the pinions $g$ $g$, being permanently in gear with them, are, of course, rotated also, as well as the counter-shaft $b$, and in the same direction as when rotated by the engine; but the self-acting clutch in the wheel $d$ then becomes inactive or thrown out of gear, as the shaft and ratchet-teeth may revolve in the same direction as when revolved by the engine without imparting motion to the wheel $d$, or to the engine-shaft or engines with which that wheel is in gear. But the wheel $d$ cannot revolve in the same direction without imparting motion to the counter-shaft and its connections, which will be understood on reference to Fig. 4. Thus, in working the windlass by manual power, the counter-shaft $b$, which is always in gear with the windlass-barrel, becomes thrown out of gear, automatically, with the clutch-wheel $d$ and the steam-engine, or whatever intermediate gearing may be between the two, and thus is obviated the necessity of moving the engines or intermediate gearing (the great friction of which would require a large amount of power) when operating the windlass by manual power alone. And, also, when any sudden or unusual strain is brought upon the purchase-wheels by the motion of the vessel or anchor, the nipping-levers, acting as pawls to the purchase-wheels, divide this strain between themselves and the driving-pinions $g$ $g$, so that but half of the strain is received by the pinions and engines, thereby preventing injury thereto. In addition to this, the men can assist the steam-engines with entire safety, owing to the independent action of the nipping-levers, which is not the case with any other arrangement, for when the steam-power exceeds the manual power the former acts with greater speed than the men can follow it, and consequently exposes them to injury.

As shown in Fig. 3, the reversing-lever $n$ is pivoted on the counter-shaft $b$, which serves as a fulcrum and is held in gear by a support, $q$, or by hand, while reversing or paying out chain; and when any undue strain is brought upon it in either direction, being pivoted upon the shaft $b$, it revolves around it, and thus becomes disengaged, and thereby prevents the strain injuring the lever or its connections. When either the hand-levers or engines are worked they revolve the windlass in the same direction, whether the gearing is set for reverse or forward motion, and they may thus act in concert, when desired. In raising the anchor and chain, the reversing-levers $n$ and pinions $o$ $o$ are thrown out of gear, and the clutch-wheels $v$ $v$ are screwed up to engage the chain-wheels with the spindle $j$, so that the spindle and wheels $i$ $i$ and $p$ $p$ revolve as one. Then, by working the hand-levers, or working the engines in the direction of the arrow in Fig. 1, the windlass-barrel revolves in a forward direction and draws in the chain and anchor. In order to raise and pay out the chain, the clutch-wheels $v$ $v$ are disengaged, allowing the chain-wheels $p$ $p$ to move independently of the spindle $j$, or wheels $i$ $i$, and the reversing-lever $n$ and pinion $o$ are swung into the position shown in Figs. 2 and 3, when the motion of all the parts is the same as before, except that of the chain-wheels $p$ $p$, which, from being loose upon the spindle $j$, are, by the interposition of the pinions $o$ $o$, moved in the reverse direction, and thus raise and pay out the chain. In heaving or lowering the anchor, the brake or clutch wheel $v$ is released, allowing the chain-wheels to rotate freely upon the spindle $j$, and let the chain run out by its own weight and that of the anchor; but in anchoring in shallow water it is sometimes found that a sufficient length of chain will not run out by itself, and hence it is desirable to have a ready and safe means of rotating the chain-wheels, so as to lift the chains out of the lockers, and this is effected, in the manner just described, by means of the reversing lever and pinion; but if, while the reversing-pinion is in gear, the chain begins to run out of itself faster than it is being paid out by the engines or men, the accelerated motion of the chain-wheels causes the reversing-pinion $o$ to revolve around the driving-pinion $g$ and become disengaged. The motion of the chain-wheel may then be regulated or checked by the brake-wheel $v$, or by the chain-controller or stop, (shown in sectional elevation in Fig. 1, and in plan in Fig. 2,) which checks or stops the motion of the chain when the check-block or lever $s$ is rotated upon its pin $t$, so as to be brought on a line with the overhanging lip $p'$ of the mouth-piece $r$.

I have shown the clutch-wheel $d$ as gearing directly with the crank-shaft $a$; but one or more toothed wheels may be interposed between them to secure greater power at the expense of speed, if deemed desirable, and the reversing-lever $n$ may be pivoted outside the counter-shaft $b$, instead of upon it, as shown in Fig. 3, when so preferred.

What I claim as my invention, and desire to secure by Letters Patent, is—

1. In combination with a windlass driven by the steam-engine A B, geared with the purchase-wheels $i$ $i$, the nipping-levers $k$ $l$ $m$, so applied as to pawl the purchase-wheels, and also to serve to rotate the windlass by manual power, either alone or as auxiliary to the steam-power, substantially as set forth.

2. In a combined steam and manual power windlass, a wheel, $d$, provided with a self-acting clutch, arranged between the crank-shaft of the engine and the windlass-barrel, substantially as and for the purpose set forth.

3. In combination with the windlass-barrel and the pinions $g\ g$, the pinions $o\ o$, mounted upon the lever $n$, operating substantially as shown and described, for the purpose set forth.

4. The lever $n$, pivoted directly upon the counter-shaft $b$, substantially as shown and described, for the purposes set forth.

In witness whereof, I have hereunto signed my name in the presence of two subscribing witnesses.

WILLIAM HORATIO HARFIELD.

Witnesses:
   C. M. S. WEST,
      *Cambridge House, Teddington.*
   W. H. PROSSER,
      *Mansion House Buildings, London.*